US012600847B2

(12) United States Patent
Park et al.

(10) Patent No.: US 12,600,847 B2
(45) Date of Patent: *Apr. 14, 2026

(54) THERMOPLASTIC RESIN COMPOSITION AND EXTERIOR MATERIAL INCLUDING THE SAME

(71) Applicant: LG CHEM, LTD., Seoul (KR)

(72) Inventors: Chun Ho Park, Daejeon (KR); Tae Hoon Kim, Daejeon (KR); Daeun Sung, Daejeon (KR); Yong Hee An, Daejeon (KR); Wangrae Joe, Daejeon (KR); Jeongmin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 929 days.

This patent is subject to a terminal disclaimer.

(21) Appl. No.: 17/796,366

(22) PCT Filed: Feb. 7, 2022

(86) PCT No.: PCT/KR2022/001826
§ 371 (c)(1),
(2) Date: Jul. 29, 2022

(87) PCT Pub. No.: WO2022/191439
PCT Pub. Date: Sep. 15, 2022

(65) Prior Publication Data
US 2024/0182694 A1    Jun. 6, 2024

(30) Foreign Application Priority Data

Mar. 8, 2021    (KR) ........................ 10-2021-0029878
Feb. 4, 2022    (KR) ........................ 10-2022-0014604

(51) Int. Cl.
*C08L 25/12*        (2006.01)

(52) U.S. Cl.
CPC ......... *C08L 25/12* (2013.01); *C08L 2205/025* (2013.01); *C08L 2205/035* (2013.01)

(58) Field of Classification Search
CPC ........... C08L 2205/025; C08L 2205/03; C08L 2205/035; C08L 25/12; C08L 25/16; C08L 33/12; C08L 51/04; C08L 77/02; C08L 77/06
See application file for complete search history.

(56) References Cited

U.S. PATENT DOCUMENTS

| | | | |
|---|---|---|---|
| 5,837,772 A | 11/1998 | Mc Kee et al. | |
| 12,031,024 B2 * | 7/2024 | Park | B32B 15/18 |
| 12,227,639 B2 * | 2/2025 | Sung | C08F 220/44 |
| 12,365,791 B2 * | 7/2025 | Sung | C08L 25/12 |
| 2004/0002568 A1 | 1/2004 | Chang et al. | |
| 2006/0148992 A1 | 7/2006 | Kim et al. | |
| 2015/0291793 A1 | 10/2015 | Minkwitz et al. | |
| 2016/0032093 A1 | 2/2016 | Abboud et al. | |
| 2017/0002189 A1 * | 1/2017 | Maeda | C08L 33/12 |

| | | |
|---|---|---|
| 2019/0382574 A1 | 12/2019 | An et al. |
| 2020/0165439 A1 | 5/2020 | An et al. |
| 2020/0283614 A1 | 9/2020 | Kim et al. |
| 2021/0024735 A1 | 1/2021 | Park et al. |
| 2021/0238404 A1 | 8/2021 | Sung et al. |
| 2024/0182694 A1 | 6/2024 | Park et al. |

FOREIGN PATENT DOCUMENTS

| | | |
|---|---|---|
| CN | 109071912 A | 12/2018 |
| CN | 112074568 A | 12/2020 |
| EP | 4 108 722 A1 | 12/2022 |
| JP | H08-311353 A | 11/1996 |
| JP | 2020-519725 A | 7/2020 |
| JP | 2023-520967 A | 5/2023 |
| KR | 10-0361161 B1 | 4/2003 |
| KR | 10-2004-0105464 A | 12/2004 |
| KR | 10-0782700 B1 | 12/2007 |
| KR | 10-2009-0095764 A | 9/2009 |
| KR | 10-2014-0096037 A | 8/2014 |
| KR | 10-2015-0069888 A | 6/2015 |
| KR | 10-2016-0127397 A | 11/2016 |
| KR | 10-2018-0050596 A | 5/2018 |
| KR | 10-2018-0076637 A | 7/2018 |
| KR | 10-2019-0065944 A | 6/2019 |
| KR | 10-2019-0114898 A | 10/2019 |
| WO | 99/33914 A2 | 7/1999 |

(Continued)

OTHER PUBLICATIONS

First Office Action dated Sep. 19, 2023 from the JPO corresponding Japanese Patent Application No. 2022-548186. Note: KR 10-2015-0069888 A cited therein is already of record.
Extended European Search Report issued in corresponding European Patent Application No. 22740740.0, dated Jul. 6, 2023.
Office Action issued in corresponding Taiwanese Patent Application No. 111105405 dated Jan. 23, 2025 Note:: WO 2020/091370 is already of record.
Office Action issued Dec. 26, 2023 for corresponding Chinese Patent Application No. 202280002505.4 Note: US 2016/0032093 A1, US 2015/0291793 A1 & US 2004/0002568 A1 were cited in a prior IDS.

(Continued)

*Primary Examiner* — Ana L. Woodward

(74) *Attorney, Agent, or Firm* — Morgan, Lewis & Bockius LLP

(57)        ABSTRACT

The present invention relates to a thermoplastic resin composition and an exterior material including the same. More particularly, the present invention has an effect of providing a thermoplastic resin composition having even and low gloss while maintaining mechanical properties and processability equal or superior to those of a conventional ASA resin; having natural coloring through control for a uniform refractive index; and being capable of reducing appearance defects due to excellent co-extrusion processability with PVC and an exterior material including the thermoplastic resin.

11 Claims, No Drawings

(56)          References Cited

FOREIGN PATENT DOCUMENTS

WO          2020/091370  A1      5/2020

OTHER PUBLICATIONS

International Search Report and Written Opinion issued in corresponding International Patent Application No. PCT/KR2022/001826, dated May 16, 2022.

* cited by examiner

THERMOPLASTIC RESIN COMPOSITION AND EXTERIOR MATERIAL INCLUDING THE SAME

CROSS-REFERENCE TO RELATED APPLICATIONS

This application claims priority to Korean Patent Application No. 10-2021-0029878, filed on Mar. 8, 2021, and Korean Patent Application No. 10-2022-0014604, re-filed on Feb. 4, 2022, based on the priority of the above patent, in the Korean Intellectual Property Office, the disclosures of each of which are incorporated herein by reference.

TECHNICAL FIELD

The present invention relates to a thermoplastic resin composition and an exterior material including the same. More particularly, the present invention relates to a low-gloss thermoplastic resin composition having even and low gloss while maintaining mechanical properties and process-ability equal or superior to those of a conventional ASA resin; having natural coloring through control for a uniform refractive index; and being capable of reducing appearance defects due to excellent co-extrusion processability with PVC and an exterior material including the low-gloss ther-moplastic resin.

BACKGROUND ART

Acrylonitrile-styrene-acrylate copolymers (hereinafter referred to as "ASA resins") have good weather resistance, aging resistance, chemical resistance, rigidity, impact resis-tance, and processability, and are widely used in various fields such as automobiles, miscellaneous goods, and con-struction materials due to broad applicability thereof.

In the field of exterior materials, customer preference for molded products with excellent matte effect and natural coloring is increasing, but development of a matte ASA resin that can satisfy these needs is insufficient.

Conventionally, a crystalline resin such as syndiotactic polystyrene (hereinafter referred to as "sPS") was added to an ASA resin or an ABS resin having a large particle size of several microns (μm) was used to realize a low-gloss ASA resin. In the case of sPS, colorability was reduced. In addition, in the case of the ABS resin having a large particle size, weather resistance was significantly deteriorated.

Notably, when manufacturing a siding material or a decking board material, an ASA resin is co-extruded with a PVC resin. In this case, since the co-extruded PVC resin has a low processing temperature, it is necessary to provide natural coloring and heat resistance while realizing a defect-free appearance at a low processing temperature.

Conventionally, an amorphous polymer such as polym-ethyl methacrylate (hereinafter referred to as "PMMA") is added to improve colorability, but impact strength is low-ered. In addition, when a heat-resistant SAN resin is added to improve heat resistance, there is a limitation in that a trade-off relationship in which colorability is lowered is observed.

RELATED ART DOCUMENTS

Patent Documents

KR 2019-0114898 A

DISCLOSURE

Technical Problem

Therefore, the present invention has been made in view of the above problems, and it is one object of the present invention to provide a low-gloss thermoplastic resin com-position having even and low gloss while maintaining mechanical properties, weather resistance, and processabil-ity equal or superior to those of a conventional ASA resin; having natural coloring due to a uniform refractive index; and being capable of reducing appearance defects due to excellent co-extrusion processability with PVC.

It is another object of the present invention to provide a molded article manufactured using the thermoplastic resin composition.

The above and other objects can be accomplished by the present invention described below.

Technical Solution

In accordance with one aspect of the present invention, provided is a thermoplastic resin composition including:

10 to 50% by weight in total of an alkyl acrylate-aromatic vinyl compound-vinyl cyanide compound graft copo-lymer (A-1) containing alkyl acrylate rubber having an average particle diameter of 0.33 to 0.5 μm and an alkyl acrylate-aromatic vinyl compound-vinyl cyanide com-pound graft copolymer (A-2) containing alkyl acrylate rubber having an average particle diameter of 0.05 to 0.2 μm;

0 to 30% by weight of an aromatic vinyl compound-vinyl cyanide compound copolymer (B-1) including 67 to 75% by weight of an aromatic vinyl compound and 25 to 33% by weight of a vinyl cyanide compound;

20 to 70% by weight of an aromatic vinyl compound-vinyl cyanide compound copolymer (B-2) including 70 to 75% by weight of an aromatic vinyl compound and 25 to 30% by weight of a vinyl cyanide compound; and 0.5 to 10% by weight of a polyamide resin (C) having a melting temperature (Tm) of 250° C. or higher, wherein the graft copolymer (A-1) and the graft copoly-mer (A-2) each has a coloring power coverage value (X) of 20% or more as calculated by Equation 1 below:

$$X = \{A/S\} \times 100, \qquad \text{[Equation 1]}$$

wherein S represents a content (wt %) of a soluble material (sol) after dissolving the graft copolymers in acetone and performing centrifugation, and A repre-sents a content (wt %) of the vinyl cyanide compound in the soluble material (sol) after dissolving the graft copolymers in acetone and performing centrifugation.

A weight ratio ((A-1+A-2):(B-1+B-2)) of a combined content of the graft copolymer (A-1) and the graft copoly-mer (A-2) to a combined content of the aromatic vinyl compound-vinyl cyanide compound copolymer (B-1) and the aromatic vinyl compound-vinyl cyanide compound copolymer (B-2) may be 1:0.5 to 1:2.

The thermoplastic resin composition may have a black and white color strength (N) of 100 or more as calculated by Equations 3 and 5 below:

Black and white color strength $(N)=\Sigma$(Absorption value of sample)/$\Sigma$(Absorption value of standard sample)×100,                    [Equation 3]

wherein the absorption value is an absorption value of a solid sample calculated by a Kubelka-Munk equation represented by Equation 5 below, and $\Sigma$ indicates spectral integration over an entire region of 400 to 700 nm:

Calculated absorption value of solid sample=$(1-R)^2/2R$,                    [Equation 5]

wherein R is a reflection coefficient value measured using an X-lite Color-eye 7000A according to a CIE Lab method.

The thermoplastic resin composition may have a chromatic color strength (C) of 110 or more as calculated by Equations 4 and 5 below:

Chromatic color strength $(C)=\lambda max$(Absorption value of sample)/$\lambda max$(Absorption value of standard sample)×100,                    [Equation 4]

wherein the absorption value is an absorption value of a solid sample calculated by a Kubelka-Munk equation represented by Equation 5 below, and $\lambda max$ is a highest absorption wavelength over an entire spectrum.

A weight ratio (A-1:A-2) of the graft copolymer (A-1) to the graft copolymer (A-2) may be 1:0.54 to 1:1.50.

The acrylate-aromatic vinyl compound-vinyl cyanide compound graft copolymer (A-1) may include 30 to 60% by weight of acrylate rubber having an average particle diameter of 0.33 to 0.5 μm, 20 to 50% by weight of an aromatic vinyl compound, and 10 to 30% by weight of a vinyl cyanide compound, and the acrylate-aromatic vinyl compound-vinyl cyanide compound graft copolymer (A-2) may include 30 to 60% by weight of acrylate rubber having an average particle diameter of 0.05 to 0.2 μm, 20 to 50% by weight of an aromatic vinyl compound, and 10 to 30% by weight of a vinyl cyanide compound.

The aromatic vinyl compound-vinyl cyanide compound copolymer (B-1) may have a weight average molecular weight of 100,000 to 150,000 g/mol, and the aromatic vinyl compound-vinyl cyanide compound copolymer (B-2) may have a weight average molecular weight of greater than 150,000 g/mol and less than or equal to 200,000 g/mol.

Based on a total weight of the thermoplastic resin composition, the aromatic vinyl compound-vinyl cyanide compound copolymer (B-1) may be included in an amount of 10 to 30% by weight, and the aromatic vinyl compound-vinyl cyanide compound copolymer (B-2) may be included in an amount of 30 to 60% by weight.

The thermoplastic resin composition including the graft copolymer (A-1), the graft copolymer (A-2), the aromatic vinyl compound-vinyl cyanide compound copolymer (B-1), and the aromatic vinyl compound-vinyl cyanide compound copolymer (B-2) may have a coloring power coverage value (Xa1+Xa2+Xb1+Xb2) of 20 to 33% as calculated by Equation 6-1 below:

$Xa1+Xa2+Xb1+Xb2=\{(Aa1/Sa1)+(Aa2/Sa2)+(Ab1/Sb1)+(Ab2/Sb2)\}\times100$,                    [Equation 6-1]

wherein Sa1, Sa2, Sb1, and Sb2 are contents (wt %) of soluble materials (sols) after dissolving the graft copolymer (A-1), the graft copolymer (A-2), the aromatic vinyl compound-vinyl cyanide compound copolymer (B-1), and the aromatic vinyl compound-vinyl cyanide compound copolymer (B-2) in acetone, respectively, and performing centrifugation, and Aa1, Aa2, Ab1, and Ab2 are contents (wt %) of the vinyl cyanide compound in the soluble materials (sols) after dissolving the graft copolymer (A-1), the graft copolymer (A-2), the aromatic vinyl compound-vinyl cyanide compound copolymer (B-1), and the aromatic vinyl compound-vinyl cyanide compound copolymer (B-2) in acetone, respectively, and performing centrifugation.

Based on 100 parts by weight of the thermoplastic resin composition, a pigment or dye (D) may be included in an amount of 0.1 to 5 parts by weight.

A weight ratio (D:C) of the pigment or dye (D) to the polyamide resin (C) may be greater than 1:1 and less than or equal to 1:10.

In accordance with another aspect of the present invention, provided is a thermoplastic resin composition including 10 to 50% by weight in total of an alkyl acrylate-aromatic vinyl compound-vinyl cyanide compound graft copolymer (A-1) containing alkyl acrylate rubber having an average particle diameter of 0.33 to 0.5 μm and an alkyl acrylate-aromatic vinyl compound-vinyl cyanide compound graft copolymer (A-2) containing alkyl acrylate rubber having an average particle diameter of 0.05 to 0.2 μm;

0 to 30% by weight of an aromatic vinyl compound-vinyl cyanide compound copolymer (B-1) including 67 to 75% by weight of an aromatic vinyl compound and 25 to 33% by weight of a vinyl cyanide compound;

20 to 70% by weight of an aromatic vinyl compound-vinyl cyanide compound copolymer (B-2) including 70 to 75% by weight of an aromatic vinyl compound and 25 to 30% by weight of a vinyl cyanide compound; and 0.5 to 10% by weight of a polyamide resin (C) having a melting temperature (Tm) of 250° C. or higher.

In accordance with yet another aspect of the present invention, provided is an exterior material including the above-described thermoplastic resin composition.

The exterior material may be a siding material, a roofing material, or a decking board material.

Advantageous Effects

As apparent from the foregoing, the present invention advantageously provides a low-gloss thermoplastic resin composition having even and low gloss while maintaining mechanical properties and processability equal or superior to those of a conventional ASA resin; having natural coloring through control for a uniform refractive index; and being capable of reducing appearance defects due to excellent co-extrusion processability with PVC and an exterior material including the low-gloss thermoplastic resin.

Accordingly, the thermoplastic resin composition and a molded article according to the present invention can be widely used to manufacture siding materials, roofing materials, and decking board materials, as a specific example, sliding doors and windows.

BEST MODE

Hereinafter, a thermoplastic resin composition of the present invention and an exterior material including the same will be described in detail.

The present inventors confirmed that, when mixing alkyl acrylate-aromatic vinyl compound-vinyl cyanide compound graft copolymers each containing acrylate-based rubber having a predetermined average particle diameter, an aromatic vinyl compound-vinyl cyanide compound copolymer, and a polyamide resin in a predetermined ratio, and adjusting the coloring power coverage values of the alkyl acrylate-aromatic vinyl compound-vinyl cyanide compound graft copolymers within a predetermined range, compatibility between an ASA resin and the polyamide resin was improved without deterioration in mechanical properties and processability compared to a conventional ASA resin composition, color strength was excellent, and gloss and colorability were improved. Based on these results, the present inventors conducted further studies to complete the present invention.

The thermoplastic resin composition of the present invention includes 10 to 50% by weight in total of an alkyl acrylate-aromatic vinyl compound-vinyl cyanide compound graft copolymer (A-1) containing alkyl acrylate rubber having an average particle diameter of 0.33 to 0.5 μm and an alkyl acrylate-aromatic vinyl compound-vinyl cyanide compound graft copolymer (A-2) containing alkyl acrylate rubber having an average particle diameter of 0.05 to 0.2 μm; 0 to 30% by weight of an aromatic vinyl compound-vinyl cyanide compound copolymer (B-1) including 67 to 75% by weight of an aromatic vinyl compound and 25 to 33% by weight of a vinyl cyanide compound; 20 to 70% by weight of an aromatic vinyl compound-vinyl cyanide compound copolymer (B-2) including 70 to 75% by weight of an aromatic vinyl compound and 25 to 30% by weight of a vinyl cyanide compound; and 0.5 to 10% by weight of a polyamide resin (C) having a melting temperature (Tm) of 250° C. or higher.

In this case, the present invention has an effect of providing a low-gloss thermoplastic resin composition having even and low gloss while maintaining mechanical properties and processability equal or superior to those of a conventional ASA resin; having natural coloring through control for a uniform refractive index; and being capable of reducing appearance defects due to excellent co-extrusion processability with PVC and an exterior material including the low-gloss thermoplastic resin.

Hereinafter, each component constituting the thermoplastic resin composition of the present invention will be described in detail as follows.

Acrylate-Aromatic Vinyl Compound-Vinyl Cyanide Compound Graft Copolymer (A-1) Containing Acrylate Rubber Having an Average Particle Diameter of 0.33 to 0.5 μm The acrylate rubber of the graft copolymer (A-1) preferably has an average particle diameter of 0.33 to 0.5 μm, more preferably 0.38 to 0.5 μm, still more preferably 0.4 to 0.5 μm. Within this range, weather resistance may be good, and mechanical properties such as fluidity, tensile strength, and impact strength may be excellent.

In the present disclosure, average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 μsec.

In addition, in the present disclosure, the average particle diameter may be an arithmetic average particle diameter in a particle size distribution measured by dynamic light scattering, specifically, a scattering intensity average particle diameter.

For example, based on a total weight of the graft copolymers (A-1) and (A-2), the graft copolymer (A-1) may be included in an amount of 50 to 90% by weight, preferably 50 to 80% by weight, more preferably 50 to 70% by weight. Within this range, weather resistance, fluidity, tensile strength, and impact strength may be excellent.

For example, the graft copolymer (A-1) may include 40 to 60% by weight of the acrylate rubber, 20 to 45% by weight of an aromatic vinyl compound, and 10 to 20% by weight of a vinyl cyanide compound, preferably 40 to 60% by weight of the acrylate rubber, 25 to 45% by weight of an aromatic vinyl compound, and 10 to 20% by weight of a vinyl cyanide compound, more preferably 45 to 55% by weight of the acrylate rubber, 30 to 40% by weight of an aromatic vinyl compound, and 10 to 20% by weight of a vinyl cyanide compound. Within this range, weather resistance, fluidity, tensile strength, and impact strength may be excellent.

In the present disclosure, a polymer including a certain compound means a polymer prepared by polymerizing the compound, and a unit in the polymer is derived from the compound.

In the present disclosure, for example, the acrylate may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

In the present disclosure, for example, the aromatic vinyl compound may include one or more selected from the group consisting of styrene, α-methylstyrene, m-methylstyrene, p-methylstyrene, and p-tert-butylstyrene, and is preferably styrene.

In the present disclosure, for example, the vinyl cyanide compound may include one or more selected from the group consisting of acrylonitrile, methacrylonitrile, ethylacrylonitrile, and isopropylacrylonitrile, and is preferably acrylonitrile.

For example, the graft copolymer (A-1) may be prepared by emulsion polymerization. In this case, chemical resistance, weather resistance, fluidity, tensile strength, and impact strength may be excellent.

Emulsion polymerization commonly practiced in the art to which the present invention pertains may be used in the present invention without particular limitation.

The graft copolymer (A-1) preferably has a coloring power coverage value (X) of 20% or more, preferably 20 to 30%, more preferably 25 to 30% as calculated by Equation 1 below. Within this range, mechanical properties, such as impact strength, tensile strength, and flexural strength, gloss, colorability, color strength, and hiding power may be excellent.

$$X = \{A/S\} \times 100 \qquad \text{[Equation 1]}$$

In Equation 1, S represents a content (wt %) of a soluble material (sol) after dissolving the graft copolymers in acetone and performing centrifugation, and A represents a content (wt %) of the vinyl cyanide compound in the soluble material (sol) after dissolving the graft copolymers in acetone and performing centrifugation In Equation 1, the content (wt %) of the vinyl cyanide compound in the soluble material (sol) after dissolving the graft copolymers in acetone and performing centrifugation is a content of the vinyl cyanide compound (based on 100% by weight in total of the added graft copolymers) in soluble matter collected in the process of obtaining a gel content. Here, the gel content is a content of insoluble matter based on 100% by weight in total of the graft copolymers.

The content of the vinyl cyanide compound in the soluble material (sol) may be measured using an NMR analyzer or a FT-IR.

Specifically, when measuring the gel content, 1 g of the graft copolymer is added to 60 ml of acetone, followed by stirring at room temperature for 12 hours. Then, centrifugation is performed to separate insoluble matter that is not dissolved in acetone, followed by drying for 12 hours. Then, the gel content is measured and calculated by Equation 2 below. As a specific measurement example, when measuring the gel content, 1 g of the graft copolymer is added to 60 ml of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the gel content is measured.

$$\text{Gel content (wt \%)} = [\text{Weight (g) of insoluble matter (gel)/Weight (g) of sample}] \times 100 \quad \text{[Equation 2]}$$

In the present disclosure, the coloring power coverage value (X) is a parameter indicating the degree of dispersion of a non-grafted vinyl cyanide compound and a vinyl cyanide compound grafted onto the alkyl acrylate rubber in the graft copolymer. A high coloring power coverage value indicates that the vinyl cyanide compound is evenly dispersed in an appropriate content. In this case, low gloss and excellent colorability and color strength may be achieved. However, when the coloring power coverage value is too high, hiding power may be reduced, and thus optimal compatibility may not be exhibited.

Acrylate-Aromatic Vinyl Compound-Vinyl Cyanide Compound Graft Copolymer (A-2) Containing Acrylate Rubber Having an Average Particle Diameter of 0.05 to 0.2 μm The acrylate rubber of the graft copolymer (A-2) preferably has an average particle diameter of 0.05 to 0.2 μm, more preferably 0.05 to 0.17 μm, still more preferably 0.1 to 0.17 μm, still more preferably 0.1 to 0.15 μm. Within this range, excellent weather resistance, colorability, impact strength, color strength, and surface gloss may be imparted to a final product.

For example, based on a total weight of the graft copolymers (A-1) and (A-2), the graft copolymer (A-2) may be included in an amount of 10 to 50% by weight, preferably 9 to 35% by weight, more preferably 12 to 22% by weight. Within this range, weather resistance, fluidity, tensile strength, and impact strength may be excellent.

For example, the graft copolymer (A-2) may include 40 to 60% by weight of the acrylate rubber, 20 to 45% by weight of an aromatic vinyl compound, and 10 to 20% by weight of a vinyl cyanide compound, preferably 40 to 60% by weight of the acrylate rubber, 25 to 45% by weight of an aromatic vinyl compound, and 10 to 20% by weight of a vinyl cyanide compound, more preferably 45 to 55% by weight of the acrylate rubber, 30 to 50% by weight of an aromatic vinyl compound, and 5 to 20% by weight of a vinyl cyanide compound, still more preferably 47 to 57% by weight of the acrylate rubber, 30 to 40% by weight of an aromatic vinyl compound, and 10 to 20% by weight of a vinyl cyanide compound. Within this range, weather resistance, fluidity, tensile strength, and impact strength may be excellent.

For example, the graft copolymer (A-2) may be prepared by emulsion polymerization. In this case, weather resistance, fluidity, tensile strength, and impact strength may be excellent.

Emulsion polymerization commonly practiced in the art to which the present invention pertains may be used in the present invention without particular limitation.

The graft copolymer (A-2) preferably has a coloring power coverage value (X) of 20% or more, preferably 20 to 30%, more preferably 25 to 30% as calculated by Equation 1. Within this range, mechanical properties, such as impact strength, tensile strength, and flexural strength, gloss, colorability, color strength, and compatibility may be excellent.

In the present disclosure, the coloring power coverage value is a parameter indicating the degree of dispersion of a non-grafted vinyl cyanide compound and a vinyl cyanide compound grafted onto the alkyl acrylate rubber in the graft copolymer. A high coloring power coverage value indicates that the vinyl cyanide compound is evenly dispersed. In this case, low gloss and excellent color strength may be achieved. However, when the coloring power coverage value is too high, hiding power may be reduced, and thus optimal color strength and hiding power may not be exhibited.

Mixing of Graft Copolymer (A-1) and Graft Copolymer (A-2)

When the acrylate-aromatic vinyl compound-vinyl cyanide compound graft copolymer (A-1) containing acrylate rubber having an average particle diameter of 0.33 to 0.5 μm and the acrylate-aromatic vinyl compound-vinyl cyanide compound graft copolymer (A-2) containing acrylate rubber having an average particle diameter of 0.05 to 0.2 μm are mixed, colorability may be greatly improved while maintaining mechanical properties and processability equal or superior to those of a conventional ASA resin, and thus quality reliability may be increased.

For example, a weight ratio (A-1:A-2) of the acrylate-aromatic vinyl compound-vinyl cyanide compound graft copolymer (A-1) to the acrylate-aromatic vinyl compound-vinyl cyanide compound graft copolymer (A-2) may be 1:0.54 to 1:1.50, as a preferred example, 1:0.55 to 1:1.30, as a more preferred example, 1:0.56 to 1:1.20. In this case, processability, elongation, surface quality, weather resistance, and transparency may be excellent.

Two Types of Aromatic Vinyl Compound-Vinyl Cyanide Compound Copolymers (B) Having Different Weight Average Molecular Weights In the present disclosure, for example, the two types of aromatic vinyl compound-vinyl cyanide compound copolymers (B) having different weight average molecular weights may include one or more selected from the group consisting of the aromatic vinyl compound-vinyl cyanide compound copolymer (B-1) having a weight average molecular weight of 100,000 to 150,000 g/mol and the aromatic vinyl compound-vinyl cyanide compound copolymer (B-2) having a weight average molecular weight of greater than 150,000 g/mol and less than or equal to 200,000 g/mol, preferably the aromatic vinyl compound-vinyl cyanide compound copolymer (B-2) alone, or a mixture of the aromatic vinyl compound-vinyl cyanide compound copolymer (B-1) and the aromatic vinyl compound-vinyl cyanide compound copolymer (B-2). In this case, heat resistance, chemical resistance, impact strength, tensile strength, and processability may be excellent.

Based on a total weight of the thermoplastic resin composition, the aromatic vinyl compound-vinyl cyanide compound copolymer (B-1) is preferably included in an amount of 0 to 30% by weight, more preferably 0 to 25% by weight, still more preferably 0 to 20% by weight, as a specific example, 1 to 30% by weight, as a specific example, 10 to 25% by weight, as a more specific example, 15 to 20% by weight. In this case, heat resistance, chemical resistance, impact strength, tensile strength, and processability may be excellent.

Based on a total weight of the thermoplastic resin composition, the aromatic vinyl compound-vinyl cyanide compound copolymer (B-2) is preferably included in an amount of 30 to 70% by weight, more preferably 30 to 60% by weight, still more preferably 35 to 60% by weight. In this case, heat resistance, chemical resistance, impact strength, tensile strength, and processability may be excellent.

In the present disclosure, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1× PLgel 10 μm MiniMix-B (250×4.6 mm)+1× PLgel 10 μm MiniMix-B (250×4.6 mm)+1× PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the aromatic vinyl compound-vinyl cyanide compound copolymers (B-1) and (B-2) may include 65 to 80% by weight of an aromatic vinyl compound and 20 to 35% by weight of a vinyl cyanide compound, preferably 67 to 80% by weight of an aromatic vinyl compound and 20 to 33% by weight of a vinyl cyanide compound, more preferably 70 to 75% by weight of an aromatic vinyl compound and 25 to 30% by weight of a vinyl cyanide compound. Within this range, chemical resistance, impact strength, tensile strength, and processability may be excellent.

For example, the aromatic vinyl polymers (B-1) and (B-2) may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

In the present disclosure, to sufficiently realize colorability and color strength and to maintain hiding power, it is preferably to exclude use of a heat resistant styrene-based resin or a methacrylate-aromatic vinyl compound-vinyl cyanide compound copolymer other than the aromatic vinyl compound-vinyl cyanide compound copolymers (B-1) and (B-2) described above, but the present invention is not limited thereto.

Mixing of Graft Copolymer (A-1), Graft Copolymer (A-2), and Two Types of Aromatic Vinyl Compound-Vinyl Cyanide Compound Copolymers (B) Having Different Weight Average Molecular Weights The thermoplastic resin composition preferably includes 10 to 50% by weight in total of the graft copolymers (A-1)

and (A-2) and 50 to 90% by weight of the two types of aromatic vinyl compound-vinyl cyanide compound copolymers (B) having different weight average molecular weights, more preferably 20 to 50% by weight of the graft copolymers (A-1) and (A-2) and 50 to 80% by weight of the two types of aromatic vinyl compound-vinyl cyanide compound copolymers (B) having different weight average molecular weights, still more preferably 30 to 50% by weight in total of the graft copolymers (A-1) and (A-2) and 50 to 70% by weight of the two types of aromatic vinyl compound-vinyl cyanide compound copolymers (B) having different weight average molecular weights, still more preferably 30 to 45% by weight in total of the graft copolymers (A-1) and (A-2) and 55 to 70% by weight of the two types of aromatic vinyl compound-vinyl cyanide compound copolymers (B) having different weight average molecular weights, most preferably 30 to 40% by weight in total of the graft copolymers (A-1) and (A-2) and 60 to 70% by weight of the two types of aromatic vinyl compound-vinyl cyanide compound copolymers (B) having different weight average molecular weights. Within this range, excellent weather resistance and low gloss may be achieved and colorability may be improved without deterioration of mechanical properties and processability. Thus, the surface appearance of a co-extruded product may be improved.

When a weight ratio ((A-1+A-2):(B-1+B-2)) of a combined content of the graft copolymer (A-1) and the graft copolymer (A-2) to a combined content of the aromatic vinyl compound-vinyl cyanide compound copolymer (B-1) and the aromatic vinyl compound-vinyl cyanide compound copolymer (B-2) is 1:0.5 to 1:2, low gloss may be achieved, and colorability and color strength properties may be improved. Thus, a co-extruded product having an aesthetically pleasing surface appearance may be manufactured.

When the thermoplastic resin composition including the graft copolymer (A-1), the graft copolymer (A-2), the aromatic vinyl compound-vinyl cyanide compound copolymer (B-1), and the aromatic vinyl compound-vinyl cyanide compound copolymer (B-2) has a coloring power coverage value (X) of 20 to 33%, preferably 25 to 30% as calculated by Equation 6 below, colorability and color strength properties may be improved, and thus a co-extruded product having an aesthetically pleasing surface appearance may be manufactured.

$$X=\{(Aa1+Aa2+Ab1+Ab2+ \quad . \quad . \quad . \quad )/(Sa1+Sa2+ Sb1+Sb2+\ldots)\}*100 \qquad \text{[Equation 6]}$$

In Equation 6, Sa1, Sa2, Sb1, and Sb2 are contents (wt %) of soluble materials (sols) after dissolving the graft copolymer (A-1), the graft copolymer (A-2), the aromatic vinyl compound-vinyl cyanide compound copolymer (B-1), and the aromatic vinyl compound-vinyl cyanide compound copolymer (B-2) in acetone, respectively, and performing centrifugation, and Aa1, Aa2, Ab1, and Ab2 are contents (wt %) of the vinyl cyanide compound in the soluble materials (sols) after dissolving the graft copolymer (A-1), the graft copolymer (A-2), the aromatic vinyl compound-vinyl cyanide compound copolymer (B-1), and the aromatic vinyl compound-vinyl cyanide compound copolymer (B-2) in acetone, respectively, and performing centrifugation.

Polyamide

Based on a total weight of the thermoplastic resin composition, the polyamide resin of the present invention is preferably included in an amount of 0.5 to 10% by weight, more preferably 1 to 10% by weight, still more preferably 3 to 8% by weight, most preferably 5 to 7% by weight. Within this range, mechanical properties and processability may be maintained above a certain level, excellent weather resistance and low gloss may be achieved, and viscoelasticity properties may be improved, thereby providing a thermoplastic resin composition having an excellent surface appearance.

The polyamide resin preferably has a melting temperature (Tm) of 250° C. or higher, as a specific example, 250 to 280° C., as a preferred example, 250 to 270° C. Within this range, low gloss and even surface gloss may be achieved, and due to a low surface roughness value, an aesthetically pleasing effect and a soft feeling may be provided.

In the present disclosure, melting temperature (Tm) may be measured using a method commonly practiced in the art to which the present invention pertains, specifically may be measured using a dynamic scanning calorimeter (DSC).

The polyamide resin preferably has a relative viscosity (96% sulfuric acid solution) of 2.5 or less, as a specific example, 2.0 to 2.5, as a preferred example, 2.2 to 2.5. Within this range, mechanical properties and processability may be maintained above a certain level, and excellent weather resistance, low gloss, and even surface gloss may be achieved. In addition, due to a low surface roughness value, a thermoplastic resin composition capable of providing an aesthetically pleasing effect and a soft feeling may be provided.

In the present disclosure, unless otherwise defined, % means % by weight.

In the present disclosure, relative viscosity may be measured using an Ubbelohde viscometer by the ISO 307 sulfuric acid method. Specifically, 1 g of a specimen to be measured is dissolved in 100 ml of an aqueous sulfuric acid solution having a concentration of 96% by weight to prepare a solution, and relative viscosity is measured at 20° C. using the solution and using a Brookfield rotational viscometer.

In the present disclosure, when the polyamide resin satisfies the melting temperature according to the present invention, the type of the polyamide resin is not particularly limited. As a specific example, the polyamide resin may include one or more selected from the group consisting of polyamide 6, polyamide 66 (PA 6.6), polyamide 46, polyamide LL, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 91, polyamide 6/9T, polyamide 6/9I, polyamide 66/9T, polyamide 6/12/9T, polyamide 66/12/9T, polyamide 6/12/9I, and polyamide 66/12/6I, preferably one or more selected from the group consisting of polyamide 6, polyamide 12, and polyamide 66.

Polymerization methods commonly practiced in the art to which the present invention pertains may be used as a method of preparing the polyamide resin without particular limitation, and commercially available polyamides may also be used when the commercially available polyamides follow the definition of the polyamide according to the invention.

Thermoplastic Resin Composition

For example, based on 100 parts by weight in total of the thermoplastic resin composition, the thermoplastic resin composition ((A-1)+(A-2)+(B-1)+(B-2)+(C)) of the present invention may include an inorganic pigment in an amount of 0.1 to 5 parts by weight, preferably 0.1 to 2 parts by weight, more preferably 0.1 to 1 part by weight, still more preferably 0.3 to 0.6 parts by weight. Within this range, weather resistance and hiding power may be excellent.

For example, the inorganic pigment may include one or more selected from the group consisting of metal compounds including Ti, Pb, Fe, and Cr and carbon black. The metal compounds are preferably metal oxides or metal hydroxides. As a specific example, the inorganic pigment may include one or more selected from the group consisting of $TiO_2$ and zinc oxide as white inorganic pigments; carbon black and graphite as black inorganic pigments; IOR, cadmium red, and red lead ($Pb_3O_4$) as red inorganic pigments; chrome yellow, zinc chromate, and cadmium yellow as yellow inorganic pigments; and chrome green and zinc green as green inorganic pigments, and most preferably, is $TiO_2$, which is a white inorganic pigment.

In the present invention, for example, a weight ratio (D:C) of the pigment or dye (D) to the polyamide resin (C) may be greater than 1:1 and less than or equal to 1:10, preferably 1:2 to 1:10, as a specific example, 1:5 to 1:10. In this case, the thermoplastic resin composition of the present invention may be suitable for siding, roofing and decking board materials.

The thermoplastic resin composition preferably has a softening point of 90° C. or higher, more preferably 90.5° C. or higher, as a specific example, 91 to 93° C. as measured under a load of 18.5 kg/cm$^2$ using an HDT Tester 6M-2K (Toyoseiki Co.) according to ASTM D648. Within this range, heat resistance may be excellent, and co-extrusion may be easily performed.

For example, the thermoplastic resin composition may have an Izod impact strength (⅛ inch) of 5 kgf·cm/cm or more, preferably 6 kgf·cm/cm or more, as a specific example, 6 to 13 kgf·cm/cm as measured according to ASTM 256. Within this range, the thermoplastic resin composition of the present invention may be suitable for siding, roofing and decking board materials.

When a gloss value of a film prepared by film-processing pellets, which have been extruded at 280° C., under conditions of barrel temperatures of 50° C., 190° C., 190° C., and 190° C. and die temperatures of 200° C., 200° C., and 200° C. is measured at 60° using a gloss meter, the thermoplastic resin composition has a gloss of 5.0 to 11.0, preferably 5.5 to 10.0, as a specific example, 5.5 to 9.0. Within this range, the thermoplastic resin composition of the present invention may be suitable for siding, roofing and decking board materials.

For example, the thermoplastic resin composition may have an L value of 90 or more, preferably 91 or more, as a specific example, 91 to 93 as measured with Hunter Lab according to the CIE Lab method. Within this range, the thermoplastic resin composition of the present invention may be suitable for siding, roofing and decking board materials.

For example, the thermoplastic resin composition may have a "b value" of 8 or more, preferably 8.1 or more, as a specific example, 8.1 to 10 as measured with Hunter Lab according to the CIE Lab method. Within this range, the thermoplastic resin composition of the present invention may be suitable for siding, roofing and decking board materials.

When correlation (G/C) between gloss (G) measured at 60° using a gloss meter and a chromaticity b value (C) measured with CIE Lab is measured, the thermoplastic resin composition may have a correlation (G/C) of 0.5 to 1.1, preferably 0.8 to 1.1, as a specific example, 0.8 to 1.0. Within this range, the thermoplastic resin composition of the present invention may be suitable for siding, roofing and decking board materials.

In the present disclosure, the coloring strength index is a parameter representing the coloring power or color yield of a dye and a pigment, and is expressed as the absorption ratio between a standard sample and a sample to directly indicate absorption by the dye and the pigment.

The method of measuring color strength is known in the art, and for example, includes the λ maxima color strength method, the Apparent color strength method, and the Integrated color strength method. The Apparent color strength method is mainly used to measure achromatic colors including white and black, and the A maxima color strength method is mainly used to measure chromatic colors.

The thermoplastic resin composition may have a black and white color strength (C/S) of 100 or more, preferably 100 to 130, as a specific example, 100 to 116 as measured by Equation 3 below, and may have a chromatic color strength (C/S) of 110 or more, preferably 113 to 130, as a specific example, 114 to 119 as measured by Equations 4 and 5 below. Within these ranges, achromatic colors or chromatic colors suitable for siding, roofing, and decking board materials may be provided.

$$\text{Black and white color strength } (N)=\Sigma(\text{Absorption value of sample})/\Sigma(\text{Absorption value of standard sample})\times100 \qquad \text{[Equation 3]}$$

In Equation 3, the absorption value is the absorption value of a solid sample calculated by the Kubelka-Munk equation represented by Equation 5 below, and Σ indicates spectral integration over an entire region of 400 to 700 nm.

$$\text{Chromatic color strength } (C)=\lambda\text{max (Absorption value of sample})/\lambda\text{max (Absorption value of standard sample})\times100 \qquad \text{[Equation 4]}$$

In Equation 4, the absorption value is the absorption value of a solid sample calculated by the Kubelka-Munk equation represented by Equation 5 below, and λmax is the highest absorption wavelength over an entire spectrum.

$$\text{Calculated absorption value of solid sample}=(1-R)^{2}/2R \qquad \text{[Equation 5]}$$

In Equation 5, R is a reflection coefficient value measured using an X-lite Color-eye 7000A according to the CIE Lab method.

As can be seen from Equation 5, absorption and scattering of color may not be measured directly, but are given as a relational expression between reflection, absorption, and scattering.

In addition, in Equation 4, Σ is defined as referring to the spectral integration value of an entire region of 400 to 700 nm.

In addition, in the present disclosure, the R (reflection coefficient value) of Equation 5 may be measured at a degree observer of 10° using an X-lite Color-eye 7000A and using a UV D65 light source according to the CIE Lab method and the SCI method under the conditions of LAV Aperture, LAV LENS, CIE GANZ 82 whiteness, YI ASTM E313-73 (D1965). The L value and the b value were measured in a reflectance mode according to the CIE Lab method according to the Munsell system. L is expressed as a number from 0 to 100. As the L value approaches 0, the degree of black increases. As the L value approaches 100, the degree of white increases. The "a" value represents a red-green value, and the "b" value represents a yellow-blue value. The C/S value is a value automatically calculated based on a software of Propalett Paint/Plastics Formulation Platinum 5.2.5.1. of GretagMacbeth LLC Co. To obtain reproducible experimental values, the average value of three samples was obtained. When standard is 100, a color strength (C/S) value of greater than 100 is shown when colorability is good.

In the present disclosure, the black and white color strength value (N) is a parameter indicating the degree of color development for black or white pigments and dyes. As the black and white color strength value increases, there is an effect that the same level of colorability may be exhibited with a small amount of pigment.

In the present disclosure, the chromatic color strength value (C) is a parameter indicating the degree of color development for pigments and dyes of chromatic colors, including grays, except for black and white. As the chromatic color strength value (C) increases, there is an effect that the same level of colorability may be exhibited with a small amount of pigment.

When necessary, based on 100 parts by weight in total of the thermoplastic resin composition ((A-1) to (C)), the thermoplastic resin composition may further include 0.01 to 5 parts by weight, 0.05 to 3 parts by weight, 0.1 to 2 parts by weight, or 0.5 to 1 part by weight of one or more selected from the group consisting of a lubricant, a pigment, a heat stabilizer, a light stabilizer, a dye, a colorant, a release agent, an antistatic agent, an antibacterial agent, a processing aid, a metal deactivator, a flame retardant, a smoke suppressant, an anti-drip agent, an anti-friction agent, and an anti-wear agent. Within this, the required physical properties of the thermoplastic resin composition of the present invention may be implemented without deterioration in the intrinsic physical properties thereof.

The thermoplastic resin composition may have a coloring power coverage value (X) of 20% or more, preferably 20 to 30%, more preferably 25 to 30% as calculated by Equation 4. Within this range, mechanical properties, such as impact strength, tensile strength, and flexural strength, gloss, colorability, color strength, and hiding power may be excellent.

In the present disclosure, as the coloring power coverage value (X) increases, the vinyl cyanide compound may be evenly dispersed, and thus gloss may be low and colorability and color strength may be excellent.

A method of preparing the thermoplastic resin composition of the present invention preferably includes a step of mixing 10 to 50% by weight in total of an alkyl acrylate-aromatic vinyl compound-vinyl cyanide compound graft copolymer (A-1) containing alkyl acrylate rubber having an average particle diameter of 0.33 to 0.5 μm and an alkyl acrylate-aromatic vinyl compound-vinyl cyanide compound graft copolymer (A-2) containing alkyl acrylate rubber having an average particle diameter of 0.05 to 0.2 μm; 0 to 30% by weight of an aromatic vinyl compound-vinyl cyanide compound copolymer (B-1) including 67 to 75% by weight of an aromatic vinyl compound and 25 to 33% by weight of a vinyl cyanide compound; 20 to 70% by weight of an aromatic vinyl compound-vinyl cyanide compound copolymer (B-2) including 70 to 75% by weight of an aromatic vinyl compound and 25 to 30% by weight of a vinyl cyanide compound; and 0.5 to 10% by weight of a polyamide resin (C) having a melting temperature (Tm) of 250° C. or higher, wherein the graft copolymer (A-1) and the graft copolymer (A-2) have coloring power coverage values (X) of 20% or more as calculated by Equation 1 below, and a step of preparing pellets at 220 to 280° C. using an extrusion kneader. In this case, excellent weather resistance and low gloss may be achieved while maintaining mechanical properties and processability equal or superior to those of a conventional ASA resin. In addition, a thermoplastic resin composition having even surface gloss and excellent colorability and color strength may be provided.

The method of preparing the thermoplastic resin composition shares all the technical characteristics of the above-described thermoplastic resin composition. Accordingly, repeated description thereof will be omitted.

The step of preparing pellets using an extrusion kneader is preferably performed at 220 to 290° C., more preferably 250 to 290° C., still more preferably 270 to 290° C. At this time, the temperature means temperature set in a cylinder.

Extrusion kneaders commonly used in the art to which the present invention pertains may be used without particular limitation, and a twin-screw extrusion kneader is preferably used.

<Exterior Material>

The exterior material of the present invention includes the thermoplastic resin composition of the present invention. In this case, even and low gloss may be achieved, and due to improvement in colorability and color strength, excellent appearance may be realized while maintaining mechanical properties and processability equal or superior to those of a conventional ASA resin.

For example, the exterior material may be a co-extrusion molded article or an injection molded article, preferably a siding material, a decking board material, or a roofing material, more preferably a sliding door or a window.

The exterior material is preferably manufactured by including a step of coextruding or injecting the thermoplastic resin composition of the present invention at a molding temperature pf 190 to 250° C., preferably 190 to 230° C., more preferably 190 to 220° C. Within this range, a matte effect may be well expressed in a product.

For example, the co-extrusion may be co-extrusion with a PVC resin. As a specific example, PVC having a thickness of 0.5 to 3.0 mm may be used, and the thermoplastic resin composition of the present invention may have a thin film thickness of 0.05 to 0.5T. When thickness is decreased due to the thermoplastic resin composition of the present invention, hiding power may be reduced, thereby increasing the content of a pigment, such as $TiO_2$. When the pigment content increases, a molded article having excellent colorability and hiding power may be manufactured.

In the description of the thermoplastic resin composition of the present invention, the method of preparing the same, and the exterior material including the same, other conditions or equipment that are not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 4 and Comparative Examples 1 to 5 are as follows.

A-1) Large-diameter graft copolymer prepared by emulsion polymerization (rubber: 50% by weight of a butylacrylate polymer having an average particle diameter of 500 nm, 35% by weight of styrene, and 15% by weight of acrylonitrile)

A-2) Small-diameter graft copolymer prepared by emulsion polymerization (rubber: 50% by weight of a butylacrylate polymer having an average particle diameter of 130 nm, 37% by weight of styrene, and 13% by weight of acrylonitrile)

A-3) Small-diameter graft copolymer prepared by emulsion polymerization (rubber: 50% by weight of a butylacrylate polymer having an average particle diameter of 130 nm, 32.5% by weight of styrene, and 17.5% by weight of acrylonitrile)

B-1) SAN resin prepared by bulk polymerization having a weight average molecular weight of 100,000 to 150,000 g/mol (90HR, styrene: 73% by weight, acrylonitrile: 27% by weight)

B-2) SAN resin prepared by bulk polymerization having a weight average molecular weight of greater than 150,000 g/mol and less than or equal to 200,000 g/mol (97HC, styrene: 70% by weight, acrylonitrile: 30% by weight)

B-3) SAN resin prepared by bulk polymerization having a weight average molecular weight of greater than 150,000 g/mol and less than or equal to 200,000 g/mol (styrene: 65% by weight, acrylonitrile: 35% by weight)

C-1) PA 6.6 having a melting temperature (Tm) of 261° C.

C-2) PA 6 having a melting temperature (Tm) of 221° C.

(D-1) Heat resistant SAN resin (prepared by bulk polymerization, weight average molecular weight: 80,000 to 100,000 g/mol, methyl-substituted styrene: 71% by weight, acrylonitrile: 29% by weight, product name: 200UH), (D-2) Polymethacrylate resin (IF850, LGMMA Co.)

(D-3) sPS surface conditioner (manufacturer: Polyone Co., product name: QT-20MN).

Examples 1 to 4 and Comparative Examples 1 to 5

According to the components and contents shown in Table 1 below, pellets were prepared at 280° C. using a 28 pi, L/D 36 standard extrusion kneader (twin-screw extruder).

TABLE 1

| Classification | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| A-1) | 19 | 23 | 28 | 22 | — | — | 35 | 25 | 23 |
| A-2) | 15 | 13 | 16 | 26 | — | — | 20 | 13 | 18 |
| A-3) | — | — | — | — | 42 | 48 | — | — | — |
| B-1) | 20 | — | 24 | 20 | — | — | — | 41 | 8 |
| B-2) | 40 | 58 | 32 | 32 | — | — | — | — | 36 |
| B-3) | — | — | — | — | 58 | 52 | — | — | — |
| C-1) | 6 | 6 | 4 | 4 | 6 | 4 | — | 6 | 15 |
| C-2) | — | — | 1 | 1 | — | 1 | — | — | — |
| D-1) | — | — | — | — | — | — | — | 15 | — |
| D-2) | — | — | — | — | — | — | 40 | — | — |
| D-3) | — | — | — | — | — | — | 5 | — | — |
| $TiO_2$ | 0.6 | 0.6 | 0.5 | 0.5 | 0.6 | 0.5 | 0.5 | 0.6 | 0.6 |

(In Table 1, TiO$_2$ content is given in parts by weight based on 100 parts by weight in total of (A-1), (A-2), (A-3), (B-1), (B-2), (B-3), (C-1), (C-2), (D-1), (D-2), and (D-3))

A film having a uniform thickness of 0.15 T was prepared using the prepared pellets and using a film extruder, the film was used as a sample, and film gloss was measured according to the following method. At this time, a single-screw extruder for sheet molding (model: E20T, 20 pi, L/D:25, Collin Co.) was used as the film extruder, and temperature conditions were set as follows: barrel temperatures of 150, 200, 210, 210° C. and die temperatures of 220, 220, and 230° C. in order from the inlet of the extruder. Prior to loading into the film extruder, the pellets were sufficiently dried in an oven at 80° C. for 3 hours or more to eliminate the effect of moisture. Then, the dried pellets were fed into the film extruder through the inlet of the film extruder to prepare a film with a uniform thickness of 0.15 T. The temperature of a rear roller was set to 85° C. using water as a medium, and the roller was configured such that one side of a resin extruded through a T-die was in contact with a roll. At this time, the screw RPM of the film extruder was fixed to 100, and the linear velocity of the roll was adjusted so that a sheet had a thickness of 0.15 T. At this time, the surface roughness value (Ra) and the film gloss of a surface in contact with the first roll among extruded sheet surfaces were measured. For reference, when measuring with a surface not in contact with the first roll, a difference may occur in surface roughness.

In addition, the prepared pellets were injected at a molding temperature of 220° C. to prepare a specimen for measuring physical properties, and the impact strength of the specimen was measured.

Test Examples

The properties of the pellets, sheets, and specimens prepared in Examples 1 to 4 and Comparative Examples 1 to 5 were measured according to the following methods, and the results are shown in Table 2 below.

Izod impact strength (kgf·cm/cm): Izod impact strength was measured according to ASTM 256.

Film gloss: Film gloss was measured at 60° using a gloss meter VG7000.

Softening point)(° C.: Softening point was measured under a load of 18.5 kg/cm$^2$ using an HDT Tester 6M-2K (Toyoseiki Co.) according to ASTM D648.

Film Gloss: Film Gloss was measured at 60° using a sheet having a thickness of 0.15T prepared by processing at 190° C. above described and using a gloss meter VG7000.

L value, b value, C/S value: L value, b value, and C/S value were measured with Hunter Lab according to the CIE Lab method. Specifically, the L value, b value, and C/S value were measured at a degree observer of 10° using an X-lite Color-eye 7000A and using a UV D65 light source according to the CIE Lab method and the SCI method under the conditions of LAV Aperture, LAV LENS, CIE GANZ 82 whiteness, YI ASTM E313-73 (D1965). The L value and b value were measured by obtaining values in a reflectance mode according to the CIE Lab method based on the Munsell system. L is expressed as a number from 0 to 100. As the L value approaches 0, the degree of black increases. As the L value approaches 100, the degree of white increases. The "a" value represents a red-green value, and the "b" value represents a yellow-blue value. The C/S value was a value automatically calculated based on a software of Propalett Paint/Plastics Formulation Platinum 5.2.5.1. of GretagMacbeth LLC Co. To obtain reproducible experimental values, the average value of three samples was obtained. When standard is 100, a color strength (C/S) value of greater than 100 is shown when colorability is good.

Color strength (unit: %): For black and white, color strength was calculated according to Equation 3 below, and for colors other than black and white, color strength was calculated according to Equation 4 below.

$$\text{Black and white color strength } (N) = \Sigma(\text{Absorption value of sample})/\Sigma(\text{Absorption value of standard sample}) \times 100 \qquad \text{[Equation 3]}$$

In Equation 3, the absorption value is the absorption value of a solid sample calculated by the Kubelka-Munk equation represented by Equation 5 below, and $\Sigma$ indicates spectral integration over an entire region of 400 to 700 nm.

$$\text{Chromatic color strength } (C) = \lambda\text{max (Absorption value of sample})/\lambda\text{max (Absorption value of standard sample}) \times 100 \qquad \text{[Equation 4]}$$

In Equation 4, the absorption value is the absorption value of a solid sample calculated by the Kubelka-Munk equation represented by Equation 5 below, and $\lambda$max is the highest absorption wavelength over an entire spectrum.

$$\text{Calculated absorption value of solid sample} = (1-R)^2/2R \qquad \text{[Equation 5]}$$

In Equation 5, R is a reflection coefficient value measured using an X-lite Color-eye 7000A according to the CIE Lab method Color strength (unit: %): Color strength was calculated according to Equation 6-1 below.

$$Xa1+Xa2+Xb1+Xb2=\{(Aa1/Sa1)+(Aa2/Sa2)+(Ab1/Sb1)+(Ab2/Sb2)\}\times100 \qquad \text{[Equation 6-1]}$$

In Equation 6-1, Sa1, Sa2, Sb1, and Sb2 are contents (wt %) of soluble materials (sols) after dissolving the graft copolymer (A-1), the graft copolymer (A-2), the aromatic vinyl compound-vinyl cyanide compound copolymer (B-1), and the aromatic vinyl compound-vinyl cyanide compound copolymer (B-2) in acetone, respectively, and performing centrifugation, and Aa1, Aa2, Ab1, and Ab2 are contents (wt %) of the vinyl cyanide compound in the soluble materials (sols) after dissolving the graft copolymer (A-1), the graft copolymer (A-2), the aromatic vinyl compound-vinyl cyanide compound copolymer (B-1), and the aromatic vinyl compound-vinyl cyanide compound copolymer (B-2) in acetone, respectively, and performing centrifugation.

TABLE 2

| Classification | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Impact strength (⅛") | 6.0 | 6.3 | 8.5 | 12.1 | 6.2 | 7.0 | 4.5 | 6.2 | — |
| Softening point | 92.8 | 92.4 | 93.8 | 90.8 | 96.1 | 91.9 | 84.2 | 93.7 | — |

TABLE 2-continued

| Classification | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Film gloss | 7.1 | 7.6 | 5.9 | 8.1 | 6.3 | 12.2 | 11.1 | 3.9 | — |
| L value | 93.18 | 92.64 | 93.41 | 91.27 | 90.48 | 90.29 | 94.92 | 93.06 | — |
| b value | 8.27 | 8.25 | 7.84 | 8.13 | 10.62 | 10.42 | 4.83 | 8.46 | — |
| Color strength (C/S) 1.0 part by weight Black | — | — | 100 | — | — | — | 129.0 | — | — |
| Color strength (C/S) 3.6 parts by weight Dark grey | — | — | — | 117.9 | — | 100 | — | — | — |
| Color strength (C/S) 2.4 parts by weight Light grey | 116.4 | 114.5 | — | — | 100 | — | — | — | — |
| Color strength (C/S) 0.6 parts by weight White | — | 115.4 | — | — | — | — | — | 100 | 107.1 |
| Color strength | 28.7 | 29.6 | 28.6 | 28.5 | 34.8 | 35.1 | 28.3 | 27.5 | 29.0 |

As shown in Table 2, it can be confirmed that, the thermoplastic resin compositions (see Examples 1 to 4) according to the present invention have natural matte properties (e.g., film gloss) while maintaining mechanical properties, such as impact strength, and heat-resistant properties, such as softening point, equal or superior to those of Comparative Examples 1 to 5 not including the composition according to the present invention. In addition, in the case of the thermoplastic resin compositions according to the present invention, since the L value, the b value, and the color strength are adjusted within a proper range, natural coloring may be provided.

Specifically, the thermoplastic resin compositions (see Examples 1 to 4) according to the present invention have an impact strength of 5.5 or more, a softening point of 90 or more, a gloss of 10 or less, and high colorability. When the impact strength is lower than the value, cracks may occur due to external impact. When the softening point is lower than the value, warping may occur in summer or by sunlight. When the gloss is higher than the value, reflected light may be generated, which may cause glare. In addition, this is not in line with the latest design trends. In particular, due to improvement in color strength, a color above a certain level may be realized even with a small amount of pigment.

On the other hand, compared to Examples 1, 2, and 4, in the case of Comparative Examples 1 and 2, it can be seen that coloration is deteriorated because color is dark due to a low L value and color is yellow due to a high "b" value. Specifically, compared to Comparative Example 1, Examples 1 and 2 exhibit excellent light grey color strength. Compared to Comparative Example 2, Example 4 exhibits excellent dark grey color strength. It can be seen that the present invention is superior in terms of color strength compared to a method of increasing a "b" value by increasing the content of a vinyl cyanide compound to similarly match the overall refractive index of a resin and increase coloring power coverage (X). Accordingly, it was confirmed that color strength was excellent within the optimal range of coloring power coverage (X).

In addition, with respect to Comparative Example 3, it is known that use of the component (D-3) reduces color strength, and when the component (D-2) is used to solve this problems, colorability is improved, but impact resistance is reduced. Considering these points, it can be seen that when the amount of a bimodal graft copolymer component (a) is increased, softening point is lowered.

In addition, in the case of Comparative Example 4, compared to Example 2, when the component (D-1) is used to improve softening point, a coloring strength index is 15.4%, which is calculated by Equation 1, indicating that color strength is reduced.

In addition, in the case of Comparative Example 5, when an excess of the component (C-1) is used, impact strength and softening point are reduced.

In addition, color strength index is 29.1 or less, which is a desired level, but physical properties that are difficult to use for this purpose are observed.

Summarizing these results, the present invention provides a resin composition including a styrene-based resin and a polyamide-based resin and satisfying coloring power coverage and color strength properties. The resin composition of the present invention has basic physical properties as a base resin used in molded articles, may provide natural matte properties, may impart colorability and color quality to exterior materials, and may improve compatibility. Accordingly, when the resin composition of the present invention is used, an exterior material having high reliability may be manufactured.

The invention claimed is:

1. A thermoplastic resin composition, comprising, based on a total weight of the thermoplastic resin composition:

10 to 50% by weight in total of:

the alkyl acrylate-aromatic vinyl compound-vinyl cyanide compound graft copolymer (A-1) containing a first alkyl acrylate rubber having an average particle diameter of 0.33 to 0.5 μm and the alkyl acrylate-aromatic vinyl compound-vinyl cyanide compound graft copolymer (A-2) containing a second alkyl acrylate rubber having an average particle diameter of 0.05 to 0.2 μm;

0 to 30% by weight of the aromatic vinyl compound-vinyl cyanide compound copolymer (B-1), the copolymer (B-1) comprising, based on 100 wt % of a sum of a first aromatic vinyl compound and a first vinyl cyanide compound:

67 to 75% by weight of the first aromatic vinyl compound and 25 to 33% by weight of the first vinyl cyanide compound;

20 to 70% by weight of the aromatic vinyl compound-vinyl cyanide compound copolymer (B-2), the copolymer (B-2) comprising, based on 100 wt % of a sum of a second aromatic vinyl compound and a second vinyl cyanide compound:

70 to 75% by weight of the second aromatic vinyl compound and 25 to 30% by weight of the second vinyl cyanide compound; and 0.5 to 10% by weight of the polyamide resin (C), the resin (C) having a melting temperature (Tm) of 250° C. or higher, wherein the graft copolymer (A-1) is an emulsion graft copolymer that comprises, based on 100 wt % of a sum of the first acrylate rubber, a third aromatic vinyl compound, and a third vinyl cyanide;

30 to 60% by weight of the first alkyl acrylate rubber that has the average particle diameter of 0.33 to 0.5 μm, 20 to 50% by weight of the third aromatic vinyl compound, and 10 to 30% by weight of the third vinyl cyanide compound, where the third aromatic vinyl compound and the third vinyl cyan compound are graft-bonded to the first acrylate rubber, wherein the graft copolymer (A-2) is an emulsion graft copolymer that comprises, based on 100 wt % of a sum of the second acrylate rubber, a fourth aromatic vinyl compound, and a fourth vinyl cyanide:

30 to 60% by weight of the second alkyl acrylate rubber that has the average particle diameter of 0.05 to 0.2 μm, 20 to 50% by weight of the fourth aromatic vinyl compound, and 10 to 30% by weight of the fourth vinyl cyanide compound, where the fourth aromatic vinyl compound and the fourth vinyl cyan compound are graft-bonded to the second acrylate rubber, wherein the copolymer (B-1) has a weight average molecular weight of 100,000 to 150,000 g/mol, wherein the copolymer (B-2) has a weight average molecular weight of greater than 150,000 g/mol and less than or equal to 200,000 g/mol, wherein each of the first aromatic vinyl compound, the second aromatic vinyl compound, the third aromatic vinyl compound, and the fourth aromatic vinyl compound includes styrene, wherein each of the first vinyl cyanide compound, the second vinyl cyanide compound, the third vinyl cyanide compound, and the fourth vinyl cyanide compound includes acrylonitrile, and wherein the graft copolymer (A-1) and the graft copolymer (A-2) each has a coloring power coverage value (X) of 20% or more as calculated by Equation 1 below:

$$X = \{A/S\} \times 100, \qquad \text{[Equation 1]}$$

wherein S represents a content (wt %) of a soluble material after dissolving the graft copolymer in acetone and performing centrifugation, and A represents a content (wt %) of the vinyl cyanide compound in the soluble material after the dissolving of the graft copolymer in acetone and performing the centrifugation.

2. The thermoplastic resin composition according to claim 1, wherein a weight ratio ((A-1+A-2):(B-1+B-2)) of a combined content of the graft copolymer (A-1) and the graft copolymer (A-2) to a combined content of the aromatic vinyl compound-vinyl cyanide compound copolymer (B-1) and the aromatic vinyl compound-vinyl cyanide compound copolymer (B-2) is 1:0.5 to 1:2.

3. The thermoplastic resin composition according to claim 1, wherein the thermoplastic resin composition has a black and white color strength (N) of 100 or more as calculated by Equations 3 and 5 below:

$$\text{Black and white color strength } (N) = \Sigma(\text{Absorption value of sample})/\Sigma(\text{Absorption value of standard sample}) \times 100, \qquad \text{[Equation 3]}$$

wherein the absorption value is an absorption value of a solid sample calculated by a Kubelka-Munk equation represented by Equation 5 below, and $\Sigma$ indicates spectral integration over an entire region of 400 to 700 nm:

$$\text{Calculated absorption value of solid sample} = (1-R)^2/2R, \qquad \text{[Equation 5]}$$

wherein R is a reflection coefficient value measured using an X-lite Color-eye 7000A according to a CIE Lab method.

4. The thermoplastic resin composition according to claim 1, wherein the thermoplastic resin composition has a chromatic color strength (C) of 110 or more as calculated by Equations 4 and 5 below:

$$\text{Chromatic color strength } (C) = \lambda\text{max}(\text{Absorption value of sample})/\lambda\text{max}(\text{Absorption value of standard sample}) \times 100, \qquad \text{[Equation 4]}$$

wherein the absorption value is an absorption value of a solid sample calculated by a Kubelka-Munk equation represented by Equation 5 below, and λmax is a highest absorption wavelength over an entire spectrum:

$$\text{Calculated absorption value of solid sample} = (1-R)^2/2R, \qquad \text{[Equation 5]}$$

wherein R is a reflection coefficient value measured using an X-lite Color-eye 7000A according to a CIE Lab method.

5. The thermoplastic resin composition according to claim 1, wherein a weight ratio (A-1:A-2) of the graft copolymer (A-1) to the graft copolymer (A-2) is 1:0.54 to 1:1.50.

6. The thermoplastic resin composition according to claim 1, comprising, based on a total weight of the thermoplastic resin composition, 10 to 30% by weight of the aromatic vinyl compound-vinyl cyanide compound copolymer (B-1), and 30 to 60% by weight of the aromatic vinyl compound-vinyl cyanide compound copolymer (B-2).

7. The thermoplastic resin composition according to claim 1, wherein the thermoplastic resin composition has a coloring power coverage value (Xa1+Xa2+Xb1+Xb2) of 20 to 33% as calculated by Equation 6-1 below:

$$Xa1 + Xa2 + Xb1 + Xb2 = \{(Aa1/Sa1) + (Aa2/Sa2) + (Ab1/Sb1) + (Ab2/Sb2)\} \times 100, \qquad \text{[Equation 6-1]}$$

wherein Sa1, Sa2, Sb1, and Sb2 are contents (wt %) of soluble materials after dissolving the graft copolymer (A-1), the graft copolymer (A-2), the aromatic vinyl compound-vinyl cyanide compound copolymer (B-1), and the aromatic vinyl compound-vinyl cyanide compound copolymer (B-2) in acetone, respectively, and performing centrifugation, and Aa1, Aa2, Ab1, and Ab2 are contents (wt %) of the vinyl cyanide compound in the soluble materials after the dissolving of the graft copolymer (A-1), the graft copolymer (A-2), the aromatic vinyl compound-vinyl cyanide compound copolymer (B-1), and the aromatic vinyl compound-vinyl cyanide compound copolymer (B-2) in acetone, respectively, and performing the centrifugation.

8. The thermoplastic resin composition according to claim 1, further comprising a pigment or dye (D) in an amount of 0.1 to 5 parts by weight, based on 100 parts by weight of the thermoplastic resin composition.

9. The thermoplastic resin composition according to claim 8, wherein a weight ratio (D:C) of the pigment or dye (D) to the polyamide resin (C) is greater than 1:1 and less than or equal to 1:10.

10. An exterior material, comprising the thermoplastic resin composition according to claim 1.

11. The exterior material according to claim 10, wherein the exterior material is a siding material, a roofing material, or a decking board material.

* * * * *